(12) United States Patent
Woods et al.

(10) Patent No.: US 12,227,242 B2
(45) Date of Patent: Feb. 18, 2025

(54) MODULAR VEHICLE POWER SOURCE STORAGE

(71) Applicant: Toyota Motor Engineering & Manufacturing North America, Inc., Plano, TX (US)

(72) Inventors: Brian Woods, Brighton, MI (US); Kenichi Iwatsuki, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 149 days.

(21) Appl. No.: 17/678,762

(22) Filed: Feb. 23, 2022

(65) Prior Publication Data
US 2023/0264766 A1    Aug. 24, 2023

(51) Int. Cl.
| | | |
|---|---|---|
| *B60L 55/00* | (2019.01) | |
| *B60L 50/60* | (2019.01) | |
| *B62D 33/02* | (2006.01) | |
| *B62D 63/02* | (2006.01) | |
| *B62D 63/06* | (2006.01) | |
| *B62D 63/08* | (2006.01) | |
| *B62D 33/06* | (2006.01) | |

(52) U.S. Cl.
CPC ............ *B62D 63/025* (2013.01); *B60L 50/66* (2019.02); *B60L 55/00* (2019.02); *B62D 33/02* (2013.01); *B62D 63/064* (2013.01); *B62D 63/08* (2013.01); *B60L 2200/36* (2013.01); *B62D 33/06* (2013.01)

(58) Field of Classification Search
CPC ...... B62D 63/025; B62D 63/08; B62D 33/02; B62D 33/06; B60L 55/00; B60L 50/66

USPC .......................................................... 180/68.5
See application file for complete search history.

(56) References Cited

U.S. PATENT DOCUMENTS

| | | | |
|---|---|---|---|
| 2,498,146 A * | 2/1950 | Trotter ..................... | B60P 7/13 414/498 |
| 4,489,977 A | 12/1984 | Earing, Jr. | |
| 4,842,326 A | 6/1989 | DiVito | |
| 5,301,997 A | 4/1994 | Cudden | |
| 5,573,300 A | 11/1996 | Simmons | |
| 6,142,549 A | 8/2000 | Clare et al. | |
| 6,571,949 B2 * | 6/2003 | Burrus, IV ............... | B60R 9/00 224/404 |
| 6,596,941 B2 * | 7/2003 | Tripoli .................... | B60R 11/02 307/151 |
| 7,942,464 B2 | 5/2011 | Schmidt | |
| 8,013,567 B2 * | 9/2011 | Windsor ............... | H02J 7/0029 320/101 |
| 8,127,879 B2 * | 3/2012 | Constans ............... | B62D 33/06 180/89.12 |

(Continued)

OTHER PUBLICATIONS

International Search Report and Written Opinion of the International Searching Authority, PCT/US2023/12844, mail date Jun. 27, 2023, 14 pages.

*Primary Examiner* — Hau V Phan
(74) *Attorney, Agent, or Firm* — Snell & Wilmer LLP

(57) ABSTRACT

Vehicles and systems for modular power source storage. A vehicle may include a power source detachable from the vehicle. The power source may supply power to the vehicle and a remote device. The vehicle may further include a cargo bed that stores the power source. The cargo bed or a portion of the cargo bed may be removable from rest of the vehicle along with the power source.

18 Claims, 18 Drawing Sheets

(56) References Cited

U.S. PATENT DOCUMENTS

| | | | | |
|---|---|---|---|---|
| 8,256,549 | B2* | 9/2012 | Crain | B60K 17/346 |
| | | | | 180/65.22 |
| 8,281,967 | B2* | 10/2012 | Evans | B60R 9/00 |
| | | | | 224/543 |
| 8,627,908 | B2* | 1/2014 | Wellborn | B60L 15/42 |
| | | | | 701/96 |
| 8,714,632 | B2 | 5/2014 | Chapman | |
| 9,227,675 | B1 | 1/2016 | Elquest | |
| 9,290,100 | B2* | 3/2016 | Wisniewski | B60L 53/14 |
| 10,086,891 | B2 | 10/2018 | Hung et al. | |
| 10,160,410 | B2 | 12/2018 | Brunais et al. | |
| 10,309,871 | B2* | 6/2019 | Hagan, Jr. | B62D 59/04 |
| 10,479,184 | B2* | 11/2019 | Matheson | B60K 6/48 |
| 10,850,659 | B2 | 12/2020 | Stocks et al. | |
| 10,910,614 | B2* | 2/2021 | Ortmann | B60L 50/64 |
| 10,933,749 | B2* | 3/2021 | Gaither | B60R 16/033 |
| 11,472,484 | B2* | 10/2022 | Willison | B62D 23/00 |
| 2011/0226539 | A1 | 9/2011 | Huss et al. | |
| 2011/0291444 | A1 | 12/2011 | Ische | |
| 2013/0240274 | A1 | 9/2013 | Vitale et al. | |
| 2014/0375272 | A1* | 12/2014 | Johnsen | B60L 58/19 |
| | | | | 320/136 |
| 2018/0326891 | A1 | 11/2018 | Stocks et al. | |
| 2019/0016231 | A1 | 1/2019 | Scaringe et al. | |
| 2019/0291587 | A1 | 9/2019 | Falconer et al. | |
| 2019/0296295 | A1 | 9/2019 | Ortmann et al. | |
| 2020/0122636 | A1 | 4/2020 | Oh | |
| 2020/0276927 | A1 | 9/2020 | York et al. | |
| 2021/0178930 | A1* | 6/2021 | da Nóbrega de Sousa da Câmara | G07C 5/085 |
| 2022/0247627 | A1* | 8/2022 | Pazhyannur | H04W 4/029 |

\* cited by examiner

MODULAR VEHICLE POWER SOURCE STORAGE

BACKGROUND

1. Field

The present disclosure is directed to storage of vehicle power sources, specifically to modular power sources and modular storage areas for power sources removable from the vehicle.

2. Description of the Related Art

Fuel-efficient vehicles (e.g., hybrid, plug-in hybrid, electric, fuel cell) continue to gain popularity over the years. Batteries of fuel-efficient vehicles that supply power to their motors (e.g., electric motor, internal combustion engine) to propel the vehicles may also supply power to native components of the vehicle (e.g., air conditioner, seat heater, infotainment unit) as well as remote devices (e.g., refrigerator, ventilator, music player, speaker, outdoor light, electric stove, movie projector, smartphone, etc.). Some batteries may even supply power to homes and recreational vehicles (RVs). Particularly, pick-up trucks and vehicles towing trailers may use vehicle batteries to supply power to remote devices off the grid while participating in recreational outdoor activities, such as camping, providing emergency services, or working in a construction site by example. Supplementary or back-up batteries may be desirable to maintain or increase the range the vehicle can travel with a single complete battery charge. Due to the versatility of use of vehicle batteries, improving the transportability and storability of vehicle batteries are desirable.

As such, there is a need for modular power sources storable in a truck bed or a trailer and modular truck beds and trailers storing power sources.

SUMMARY

Examples described herein relate to vehicles and systems for modular power source storage. A vehicle may include a power source detachable from the vehicle. The power source may supply power to the vehicle and a remote device. The vehicle may further include a cargo bed that stores the power source. The power source may be integrated with a portion or portions of the cargo bed. The cargo bed or at least a portion of the cargo bed may be removable from rest of the vehicle along with the power source. Alternatively, or additionally, the power source may be removable from the cargo bed.

In one aspect, the disclosure is embodied in a vehicle. The vehicle includes a power source. The power source is detachable from the vehicle and supplies power to the vehicle and a remote device. The vehicle further includes a cargo bed. The cargo bed stores the power source.

These and other embodiments may optionally include one or more of the following features. The cargo bed may include a floor. The floor may be detachable from the vehicle. The power source may be integrated with the floor. Alternatively, the floor may support the power source from below and the cargo bed may further include a false floor that covers the power source from above. The power source may be a plurality of modular batteries that may be stacked on top of or next to each other.

The vehicle may further include a cabin. The cabin may hold a person. The cargo bed may be removably attachable to the cabin. The cargo bed may be coupled to one or more wheels that rotate on a ground surface to tow the cargo bed to a desired location when the cargo bed is detached from the cabin.

The cargo bed may include a detachable enclosure that covers all or a portion of the cargo bed. The power source may be integrated with the enclosure. The cargo bed may include a tailgate. Alternatively, the power source may be integrated with the tailgate.

In another aspect, the disclosure is embodied in a system. The system includes a vehicle. The system further includes a power source. The power source supplies power to the vehicle and a remote device. The system further includes a trailer. The trailer is removably coupled to the vehicle and stores the power source.

These and other embodiments may optionally include one or more of the following features. The trailer may include a floor. The floor may be detachable from rest of the trailer. The power source may be integrated with the floor. Alternatively, the floor may support the power source from below. The trailer may further include a false floor to cover the power source from above. The power source may be a plurality of modular batteries that may be stacked on top of or next to each other.

The trailer may be coupled to one or more wheels that rotate on a ground surface to tow the trailer to a desired location when the trailer is detached from the vehicle. The trailer may include a detachable enclosure that covers the trailer. The power source may be integrated with the enclosure. The trailer may include a tailgate. Alternatively, the power source may be integrated with the tailgate.

In yet another aspect, the disclosure is embodied in a vehicle. The vehicle includes a frame. The vehicle further includes a cabin. The cabin is coupled to the frame and holds a person. The vehicle further includes a cargo bed. The cargo bed has at least one portion that is removably attached to the frame. The vehicle further includes a power source. The power source is coupled to the at least one portion of the cargo bed and supplies power to the vehicle and a remote device.

These and other embodiments may optionally include one or more of the following features. The at least one portion may be a floor of the cargo bed. The power source may be integrated with the floor. Alternatively, the floor may support the power source from below. The cargo bed may further include a false floor to cover the power source from above. The power source may be a plurality of modular batteries that may be stacked on top of or next to each other. The at least one portion of the cargo bed may be coupled to one or more wheels that rotate on a ground surface to tow the power source to a desired location when the at least one portion is detached from the frame.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

The vehicles and systems described herein permit modular power source storage. A vehicle may include a power source detachable from the vehicle. The power source may be a battery or a fuel cell. The power source may supply power to the vehicle (e.g., electric motor, infotainment system, air conditioning, etc.) and a remote device (e.g., electronic device, camping equipment, a home, etc.). The vehicle may further include a cargo bed and/or tow a trailer that stores the power source. The power source may be integrated with a portion or portions of the cargo bed and/or the trailer (e.g., floor, enclosure, tailgate, etc.). The cargo bed and/or the trailer or at least a portion of the cargo bed and/or the trailer may be advantageously removable from the vehicle along with the power source. Alternatively, or additionally, the power source may be advantageously removable from the cargo bed and/or the trailer. The power source may then be transported to and placed at a desired or a convenient location to power otherwise difficult to reach remote devices if the power source were to be fixed to the vehicle. The term "driver" or "user" may be interchanged with "passenger" when referring to autonomous or semi-autonomous vehicles. The couplings, decouplings, attachments, detachments, and/or the like discussed herein may be performed manually by hand and/or automatically (e.g., springs, motors, etc.). Following a reverse order of operations of couplings or attachments discussed herein may describe decouplings or detachments and vice versa.

Figure 1A:
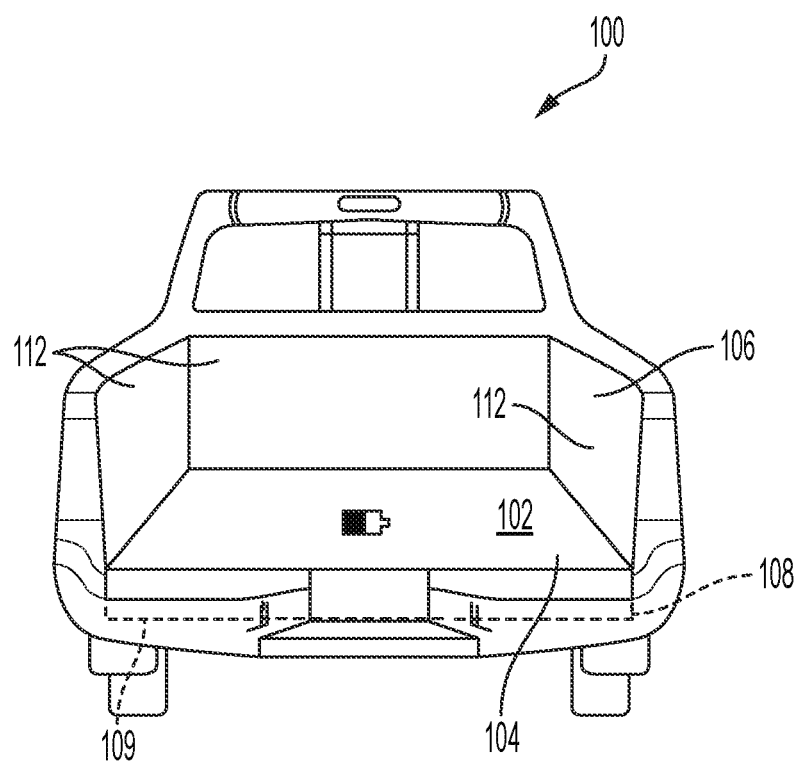
FIG. 1A illustrates a rear view of a vehicle having a power source integrated with a detachable floor of a cargo bed according to an aspect of the present disclosure.

FIG. 1A illustrates a rear view of a vehicle 100 having a power source 102 integrated with a detachable floor 104 of a cargo bed 106. The vehicle 100 may be a vessel that is configured to transport one or more persons. The vehicle 100 may be a truck, or more specifically, a pick-up truck. The vehicle 100 may be an electric vehicle where the power source 102 is a battery (or multiple batteries). The vehicle 100 may be fully electric and solely rely on an electric motor to propel the vehicle 100 forward. In another example, the vehicle 100 may be a partial electric vehicle, such as a hybrid vehicle or a plug-in hybrid vehicle, where an internal combustion engine and an electric motor in combination propels the vehicle 100 forward. In such an example, the power source 102 may be partially a battery. In yet another example, the vehicle 100 may be a hydrogen fuel-cell vehicle that has a standalone fuel cell or a fuel cell and a battery as the power source 102 for an electric motor to draw electricity from.

In FIG. 1A, the power source 102 is a battery by example. The battery may be one or more batteries connected to each other and to an electric motor to power the electric motor. The battery may also provide power to other electrical components associated with the vehicle 100 or remote from the vehicle 100. For example, the electrical components may be an air conditioner, a seat heater, an infotainment unit, a telephone, a refrigerator, a ventilator, an electronic device being charged, lights, a sound system, a winch, a television display, a gaming console, and/or the like.

The battery may be any kind of battery, for example, a lithium-ion battery. The battery may require charging at a charging station as needed based on battery charge consumption similar to fueling a vehicle at a gas station. The charging station may be a designated charging station that resembles a gas station or may be located at one's home garage, a public or private parking garage, a parking lot, and the like.

The power source 102 or the battery may be integrated with the floor 104 of the cargo bed 106. The power source 102 may be either fully or partially enclosed or encased by the floor 104 or form a part or entirety of the floor 104. The floor 104 may be made from a material or materials that protect the power source 102 from physical impact exerted from above, such as when a heavy-duty construction tool is tossed in the cargo bed 106. For example, the floor 104 may be solely aluminum or coated with a liner material (e.g., a vinyl polymer) that provides additional protection and grip.

The floor 104 may be inserted within and rest in a recess or cavity 108 that extends below the cargo bed 106. The recess 108 is shown by the dashed lines in FIG. 1A. The recess 108 may have a base 109 that supports the floor 104 from below. In some embodiments, the recess 108 may have mounts attached to two or more of sidewalls 112 of the cargo bed 106 that support the floor 104 from below. While within the recess 108, the power source 102 may be electrically coupled to the electric motor and native electric devices of the vehicle 100 as well as auxiliary devices electrically coupled to an electrical circuit of the vehicle 100. The electrical connection may be concealed within the recess 108 when the floor 104 is inserted within the recess 108. As such, the power source 102 may be entirely concealed and the floor 104 may have the appearance of a conventional floor of a cargo bed of a truck. The floor 104 may be fastened to the cargo bed 106 with conventional fasteners (e.g., clips, hooks, anchors, screws, etc.) to prevent the floor 104 from moving around and the power source 102 from disconnecting from the electric motor and the electric circuit of the vehicle 100, especially when the vehicle 100 is in motion. A tailgate of the cargo bed 106 is omitted in FIGS. 1A-1B for clarity.

Figure 1B:
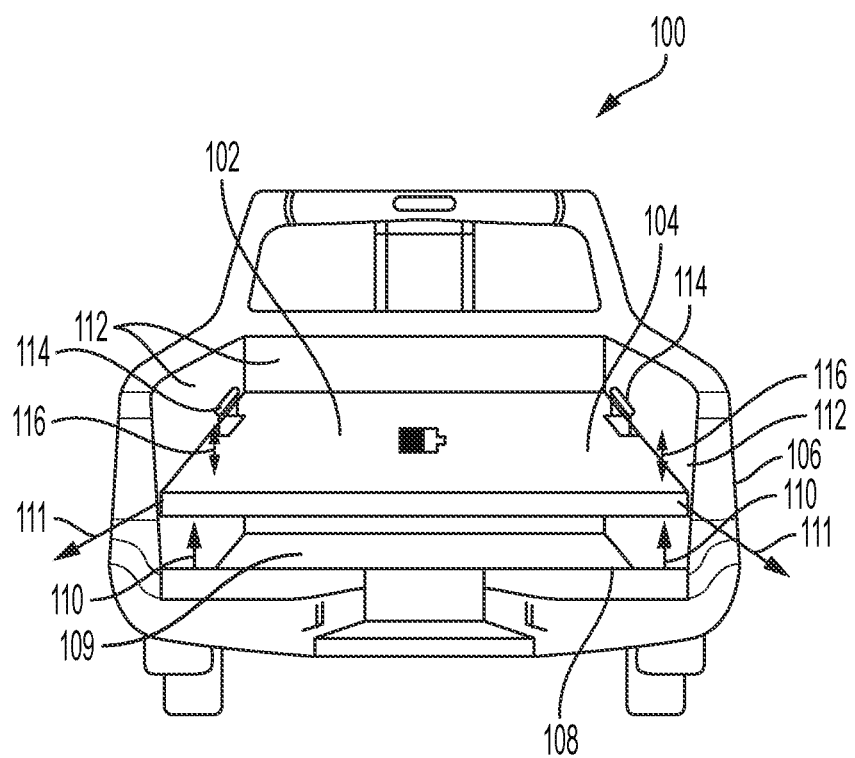
FIG. 1B illustrates a rear view of the vehicle of FIG. 1A with the power source integrated with the floor of the cargo bed being detached according to an aspect of the present disclosure.

FIG. 1B illustrates a rear view of the vehicle 100 with the power source 102 integrated with the floor 104 of the cargo bed 106 being detached. The power source 102 may be lifted up from and out of the recess 108 along with the floor 104 in the direction of arrows 110. The power source 102 may then be removed from the cargo bed 106 in the direction of arrows 111. The floor 104 may have one or more grips 114 to grab the floor 104 during attachment and detachment. The grips 114 may be telescoping or retractable and may move in the directions of the arrows 116. As such, the grips 114 may be concealed when not in use. In some embodiments, the grips 114 may be one or more cavities on the floor 104 that allow for one or more fingers or a removal tool to be inserted. The grips 114 may be coated with a conventional gripping material (e.g., synthetic leather, silicone, nitrile, etc.) to reduce or prevent slipping. The grips 114 may be located on opposing sides of each other. The grips 114 may distanced from each other by a length that is approximately equal to or less than an average wingspan of an adult to allow for one individual to detach the power source 102 from the vehicle 100.

Figure 2:
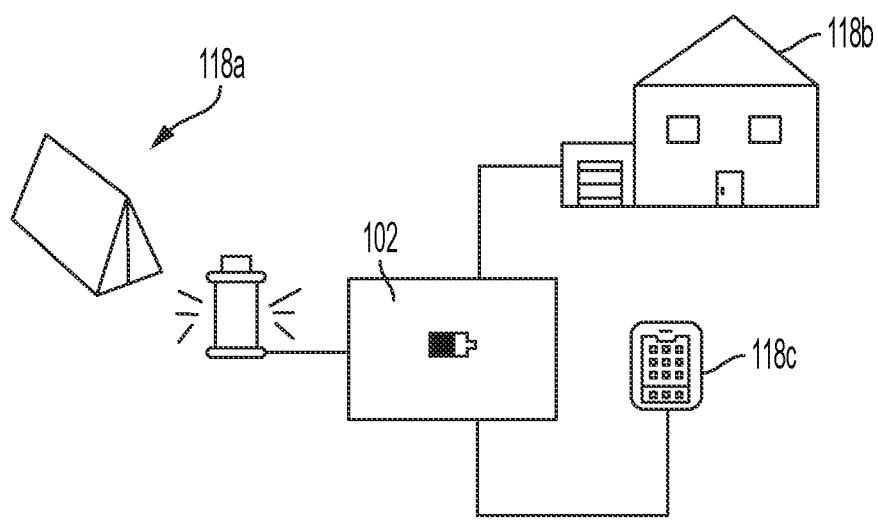
FIG. 2 illustrates a schematic diagram of a power source of a vehicle coupled to remote devices according to an aspect of the present disclosure.

Once detached from the vehicle 100, the power source 102 may be transported to a location away from the vehicle 100 and positioned as desired to supply power to remote devices 118a-c (see FIG. 2). The power source 102 may be held from the grips 114 during transport. In some embodiments, the power source 102 may have one or more wheels and a handle, which may be telescoping, to roll the power source 102 on a ground surface like a rolling backpack or a cooler.

FIG. 2 illustrates a schematic diagram of the power source 102 coupled to remote devices 118a-c. The remote device 118a is electric camping gear (an exemplary lantern is shown in FIG. 2), the remote device 118b is a circuit system of a home, and the remote device 118c is a smartphone by example. The remote devices 118a-c may be located or need to be located at a location where the vehicle 100 cannot access or be in a proximity to allow an electrical connection between the power source 102 and the remote devices 118a-c. When the power source 102 is detached from the vehicle 100, the power source 102 may be transported to a location and positioned such that an electrical connection between the power source 102 and one or more of the remote devices 118a-c may be established. The power source 102 may then supply power to one, some, or all of the remote devices 118a-c.

Figure 3A:
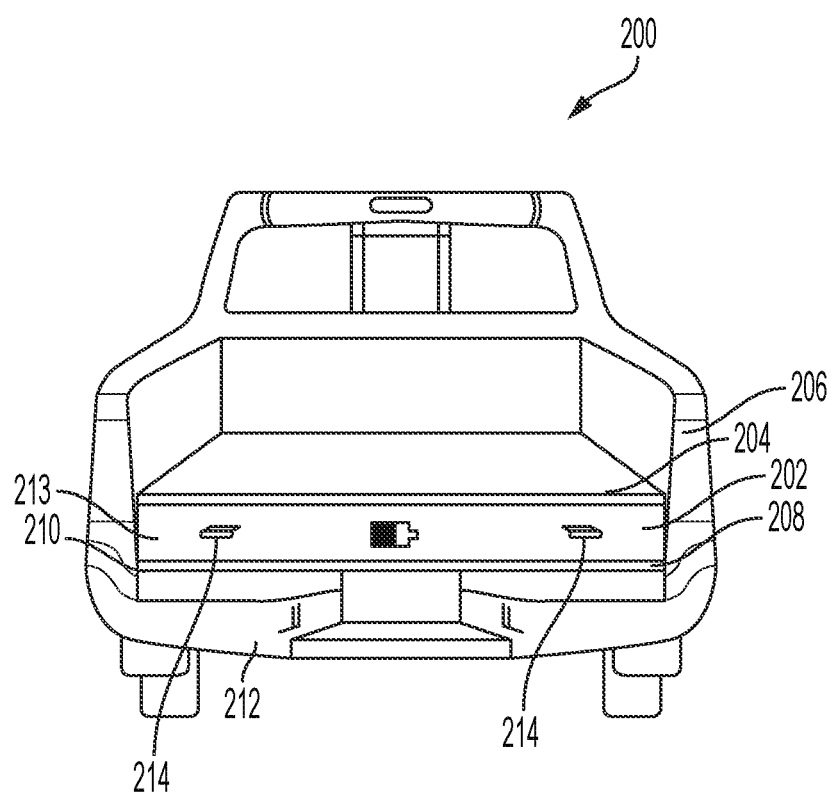
FIG. 3A illustrates a rear view of a vehicle having a removable power source under a false floor of a cargo bed according to an aspect of the present disclosure.

FIG. 3A illustrates a rear view of a vehicle 200 having a removable power source 202 under a false floor 204 of a cargo bed 206. The vehicle 200 may have some or all of the specifications of the vehicle 100 (see FIGS. 1A-1B) except for the power source 202 being stored under a false floor of the cargo bed 206. The power source 202 may have some or all of the specifications of the power source 102 except for the physical structure of the power source 102.

The power source 202 may be supported from below by a floor 208 of the cargo bed 206. The floor 208 may be level with, above, or below an upper edge 210 of a rear bumper 212 of the vehicle 200. The floor 208 being lower relative to the upper edge 210 of the rear bumper 212 may increase the space available for the power source 202 to be concealed. As a result, the cargo space provided by the cargo bed 206 may increase.

The power source 202 may be covered entirely or partially from above by the false floor 204. The false floor 204 may have the appearance of a conventional truck bed floor. The false floor 204 may be made from a material or materials that protect the power source 202 from physical impact exerted from above. For example, the false floor 204 may be solely aluminum or coated with a liner material (e.g., a vinyl polymer) that provides additional protection and grip.

While sandwiched between the false floor 204 and the floor 208, the power source 202 may be electrically coupled to the electric motor and native electric devices of the vehicle 200 as well as auxiliary devices electrically coupled to an electrical circuit of the vehicle 200. The electrical connection may be concealed between the power source 202 and the cargo bed 206.

The false floor 204 may be fastened to the cargo bed 206 with conventional fasteners (e.g., tracks, clips, hooks, anchors, screws, etc.) to prevent the power source 202 from moving around and disconnecting from the electric motor and the electric circuit of the vehicle 200, especially when the vehicle 200 is in motion. The vehicle 200 may include a cover to prevent the power source 202 from sliding out of the cargo bed 206 if the tailgate is in a down position or is not being utilized. The cover may be attachable to the false floor 204 and/or the floor 208 and cover the space between the false floor 204 and the floor 208. In some embodiments, the false floor 204 and/or the floor 208 may have a portion that extend over a proximal side surface 213 of the power source 202 to retain the power source 202 in place. In some embodiments, the false floor 204 and/or the floor 208 may have a male part that may be coupled to a female part on the power source 202 or vice versa to retain the power source 202 in place.

The power source 202 may have one or more grips 214 to detach the power source 202 from the vehicle 200. The one or more grips 214 may be similar in structure and functionality to the grips 114 shown in FIGS. 1A-1B. In embodiments where the false floor 204 is removed prior to detaching the power source 202, the false floor 204 may also have one or more grips to hold the false floor 204 during removal.

Figure 3B:
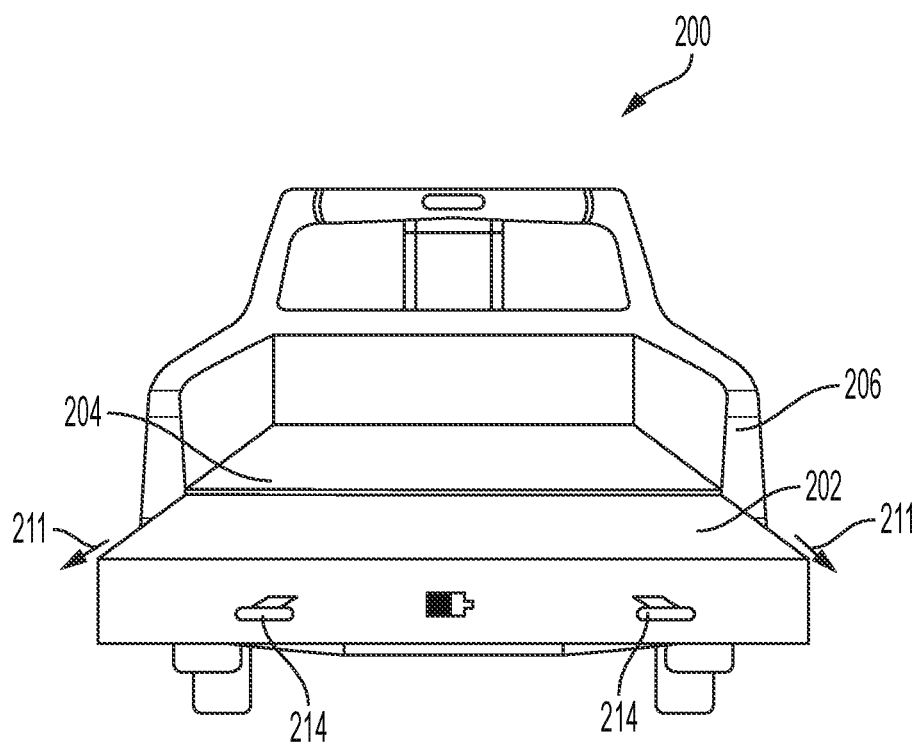
FIG. 3B illustrates a rear view of the vehicle of FIG. 3A with the power source being removed according to an aspect of the present disclosure.

FIG. 3B illustrates a rear view of the vehicle 200 with the power source 202 being removed. The power source 202 may be removed from the cargo bed 206 in the direction of arrows 211. In embodiments where the floor 208 (see FIG. 3A) is lower relative to the upper edge 210 (see FIG. 3A) of the rear bumper 212 (see FIG. 3A), the power source 202 may be lifted up to clear the upper edge 210 of the rear bumper 212 prior to being removed in the direction of the arrows 211. In some embodiments, the false floor 204 may be removed from the cargo bed 206 in the direction of the arrows 211 or lifted up prior to lifting up the power source 202.

Once detached from the vehicle 200, the power source 202 may be transported to a location away from the vehicle 200 and positioned as desired to supply power to the remote devices 118*a-c* (see FIG. 2). The power source 202 may be held from the grips 214 during transport. In some embodiments, the power source 202 may have one or more wheels and a handle, which may be telescoping, to roll the power source 202 on a ground surface like a rolling backpack or a cooler.

Figure 4A:
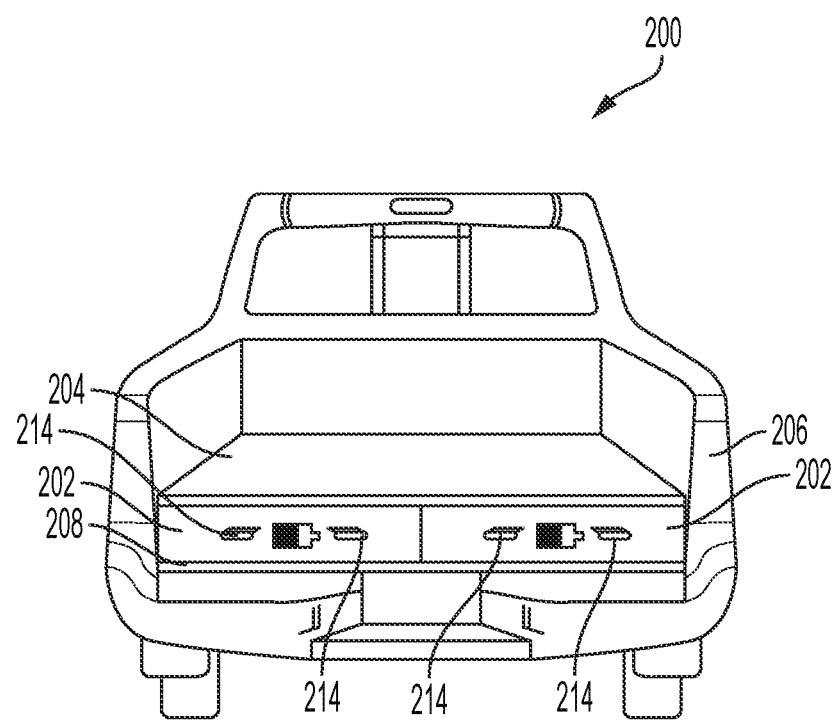
FIG. 4A illustrates a rear view of a vehicle having multiple power sources stacked next to each other under a false floor of a cargo bed according to an aspect of the present disclosure.

FIG. 4A illustrates a rear view of the vehicle 200 having multiple power sources 202 stacked next to each other under the false floor 204 of the cargo bed 206. Two power sources 202 are shown in FIG. 4A by example only and there may be more power sources 202 than two in other embodiments. Having multiple power sources 202 may provide a back-up power source if one of the power sources 202 is drained, malfunctioning, damaged, or already being used. Further, having multiple power sources 202 may increase the battery capacity relative to a single power source 202 (see FIGS. 3A-3B). Additionally, multiple power sources 202 may be easier to remove and transport than a single power source 202 having dimensions equivalent to combined dimensions of the multiple power sources 202 due to reduced weight and/or size. Each power source 202 may have one or more handles 214 to be held during attachment and detachment procedures.

The power sources 202 may be shaped such that they sit flush next to each other when inserted between the false floor 204 and the floor 208. The power sources 202 may be coupled to each other for additional security and to further prevent movement when the vehicle 200 is in motion. For example, one power source 202 may have a male part and an adjacent power source 202 may have a female part that retains the female part to couple two power sources 202 together.

Figure 4B:
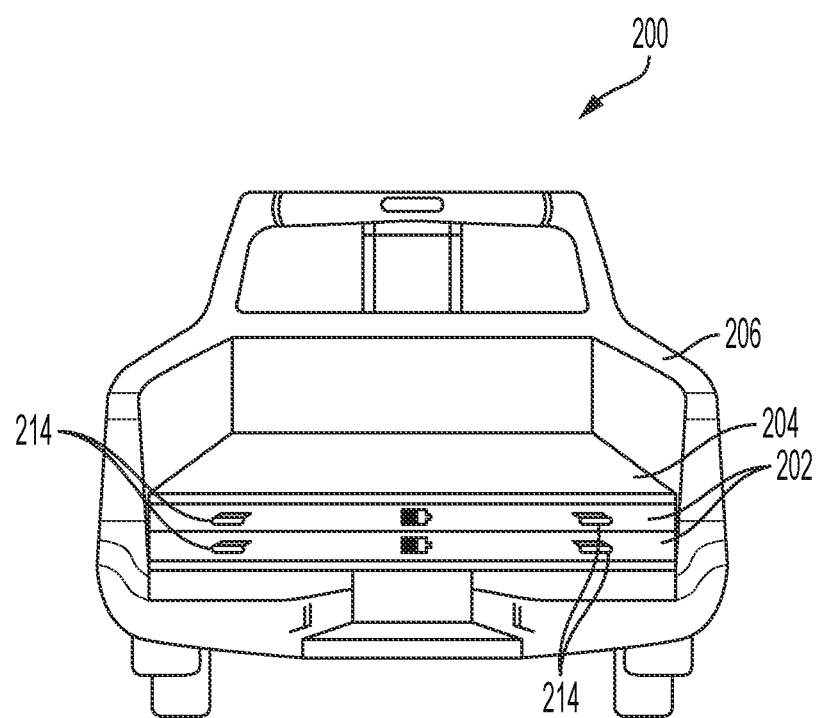
FIG. 4B illustrates a rear view of a vehicle having multiple power sources stacked on top of each other under a false floor of a cargo bed according to an aspect of the present disclosure.

FIG. 4B illustrates a rear view of the vehicle 200 having multiple power sources 202 stacked on top of each other under the false floor 204 of the cargo bed 206. Two power sources 202 are shown in FIG. 4B by example only and there may be more power sources 202 than two in other embodiments. In some embodiments, the multiple power sources 202 may be both stacked on top of each other and next to each other. Each power source 202 may have one or more handles 214 to be held during attachment and detachment procedures.

The power sources 202 may be shaped such that they sit flush with respect to each other when stacked and inserted between the false floor 204 and the floor 208. The power sources 202 may be coupled to each other for additional security and to further prevent movement when the vehicle 200 is in motion. For example, one power source 202 may have a male part and an adjacent power source 202 may have a female part that retains the female part to couple two power sources 202 together.

Figure 5:
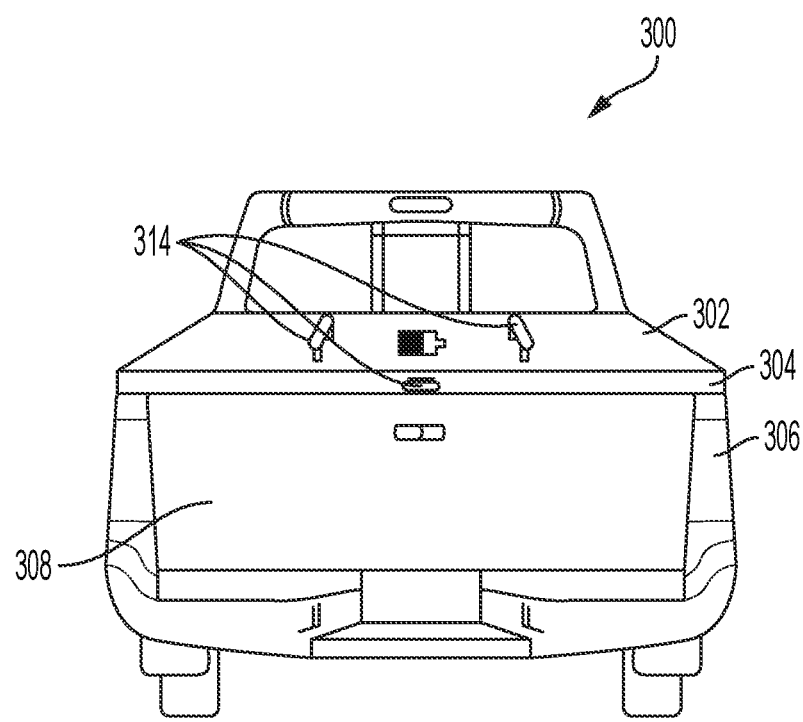
FIG. 5 illustrates a rear view of a vehicle having a power source integrated with a detachable enclosure of a cargo bed according to an aspect of the present disclosure.

FIG. 5 illustrates a rear view of a vehicle 300 having a power source 302 integrated with a detachable enclosure 304 of a cargo bed 306. The vehicle 300 may have some or all of the specifications of the vehicle 100 (see FIGS. 1A-1B) except for the power source 302 being stored under a false floor of the cargo bed 306. The power source 302 may have some or all of the specifications of the power source 102 except for the physical structure of the power source 102.

The power source 302 or the battery may be integrated with the enclosure 304 of the cargo bed 306. The power source 302 may be either fully or partially encased by the enclosure 304 or form a part or entirety of the enclosure 304. The enclosure 304 may be made from a material or materials that protect the power source 302 from physical impact. For example, the enclosure 304 may be solely aluminum or coated with a liner material (e.g., a vinyl polymer) that provides additional protection and grip.

The enclosure 304 may function like a conventional cargo bed enclosure. The enclosure 304 may be coupled to the cargo bed 306 and/or the tailgate 308 from one or more sides. The enclosure 304 may hinge up and down from the coupling points to access under the enclosure 304. In some embodiments, the enclosure 304 may slide in and out of tracks on the cargo bed 306 to be attached to and detached from the cargo bed 306, respectively. In some embodiments, the tailgate 308 may extend over and/or be coupled to the enclosure 304 for added security and minimal or no movement of the enclosure 304. In such embodiments, the tailgate 308 may have to be opened prior detaching the enclosure 304 from the cargo bed 306. While the enclosure 304 is coupled to the cargo bed 306, the power source 302 may be electrically coupled to the electric motor and native electric devices of the vehicle 300 as well as auxiliary devices electrically coupled to an electrical circuit of the vehicle 300. The electrical connection may be concealed under the enclosure 304. As such, the power source 302 may be entirely concealed and the enclosure 304 may have the appearance of a conventional cargo bed enclosure of a truck.

The enclosure 304 may have one or more grips 314 to detach the enclosure and hence the power source 302 from the vehicle 300. The one or more grips 314 may be similar in structure and functionality to the grips 114 shown in FIGS. 1A-1B.

Figure 6:
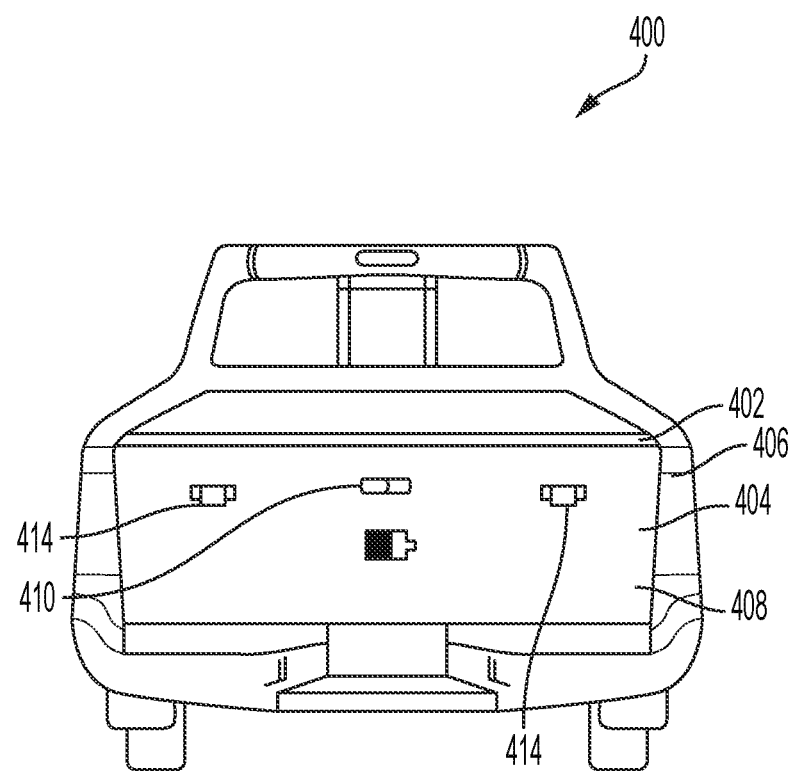
FIG. 6 illustrates a rear view of a vehicle having a detachable power source integrated with a tailgate according to an aspect of the present disclosure.

FIG. 6 illustrates a rear view of a vehicle 400 having a detachable power source 402 integrated with a tailgate 404. The vehicle 400 may have some or all of the specifications of the vehicle 100 (see FIGS. 1A-1B) except for the power source 402 being stored under a false floor of the cargo bed 406. The power source 402 may have some or all of the specifications of the power source 102 (see FIGS. 1A-1B) except for the physical structure of the power source 102.

The power source 402 or the battery may be integrated with the tailgate 404. The power source 402 may be either fully or partially encased by the tailgate 404 or form a part or entirety of the tailgate 404. The tailgate 404 may be made from a material or materials that protect the power source 402 from physical impact. For example, the tailgate 404 may be solely aluminum or coated with a liner material (e.g., a vinyl polymer) that provides additional protection and grip.

The tailgate 404 may function like a conventional tailgate of a truck or an SUV. The tailgate 404 may be coupled to the cargo bed 406 from one or more sides. The tailgate 404 may hinge up and down or side to side from the coupling points to access behind the tailgate 404. In some embodiments, the tailgate 404 may slide up and down inside tracks on the cargo bed 406 to be detached from and attached to the cargo bed 406, respectively. In some embodiments, an enclosure that encloses the cargo bed 406 may extend over and/or be coupled to the tailgate 404 for added security and minimal or no movement of the tailgate 404. In such embodiments, the enclosure may have to be removed prior detaching the tailgate 404 from the cargo bed 406. While the tailgate 404 is coupled to the cargo bed 406, the power source 402 may be electrically coupled to the electric motor and native electric devices of the vehicle 400 as well as auxiliary devices electrically coupled to an electrical circuit of the vehicle 400. The electrical connection may be concealed under the tailgate 404 or between the tailgate 404 and the cargo bed 406. As such, the power source 402 may be entirely concealed and the tailgate 404 may have the appearance of a conventional tailgate.

The tailgate 404 may have one or more grips 414 to detach the tailgate 404 and hence the power source 402 from the vehicle 400. The one or more grips 414 may be similar in structure and functionality to the grips 114 shown in FIGS. 1A-1B. The one or more grips 414 may be located on either side or both sides of the tailgate 404. An outer side 408 of the tailgate 404 is shown as having grips 414 by example in FIG. 6. In some embodiments, a handle 410 of the tailgate 404 that is used to open and close the tailgate 404 when the tailgate 404 is attached to the cargo bed 406 may be used to hold the tailgate 404 when removing and transporting the tailgate 404.

Figure 7:
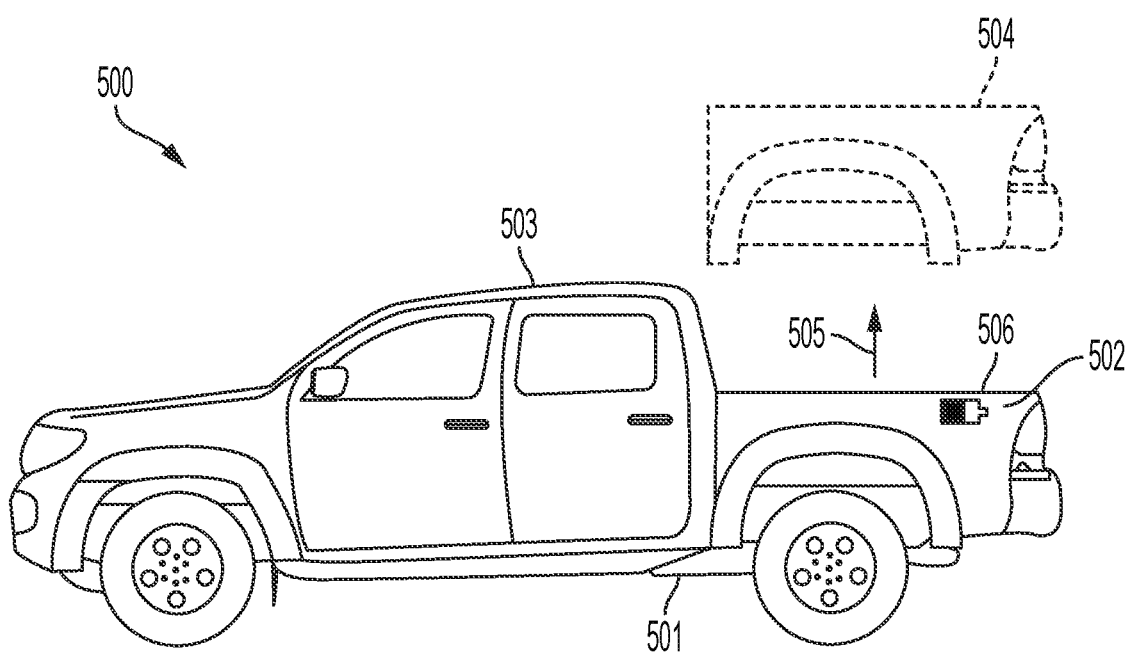
FIG. 7 illustrates a side view of a vehicle having a removable cargo bed storing a power source according to an aspect of the present disclosure.

FIG. 7 illustrates a side view of a vehicle 500 having a removable cargo bed 506 storing a power source 502. The vehicle 500 may have some or all of the specifications of the vehicle 100 (see FIGS. 1A-1B). The power source 502 may have some or all of the specifications of the power source 102 (see FIGS. 1A-1B) except for the physical structure of the power source 102. The power source 502 may be stored in or on the cargo bed 506. The power source 502 may be enclosed or encased by the cargo bed 506 in entirety or partially. The power source 502 may be fully or partially integrated with the cargo bed 506. The cargo bed 506 and/or an enclosure disposed over the power source 502 may be made from a material or materials that protect the power source 502 from physical impact. The power source 502 may be fastened to the cargo bed 506 via conventional fasteners (e.g., tracks, clips, hooks, anchors, screws, etc.) to prevent the power source 502 from moving around and disconnecting from the electric motor and the electric circuit of the vehicle 500, especially when the vehicle 500 is in motion.

The vehicle 500 may have a cabin 503. The cabin 503 may hold at least one person, which may be a driver and/or a passenger. The cabin 503 and the cargo bed 506 may be individually or collectively coupled to a frame 501 of the vehicle 500. The cargo bed 506 may also be directly coupled to the cabin 503. The cargo bed 506 may be fastened to the frame 501 and the cabin 503 via conventional fasteners (e.g., tracks, clips, hooks, anchors, screws, etc.). The cargo bed 506 and hence the power source 502 may be detached from the frame 501 or detached from the frame 501 and the cabin 503. The cargo bed 506 in a detached state is shown by dashed lines 504. The cargo bed 506 may be detached by lifting up the cargo bed 506 from the frame 501 in the direction of the arrow 505 by example. In some embodiments, the cargo bed 506 may be detached by pulling the cargo bed in a direction away from the cabin 503 that transverses the arrow 505.

While the cargo bed 506 is coupled to the cabin 503, the power source 502 may be electrically coupled to the electric motor and native electric devices of the vehicle 500 as well as auxiliary devices electrically coupled to an electrical circuit of the vehicle 500. The electrical connection may be concealed between the cabin 503 and the cargo bed 506 or under the vehicle 500 by example. As such, the power source 502 may be entirely concealed and the cargo bed 503 may have the appearance of a conventional cargo bed.

Once detached from the vehicle 500, the power source cargo bed 506 and hence the power source 502 may be transported to a location away from the vehicle 500 and positioned as desired to supply power to remote devices 118*a-c* (see FIG. 2). The cargo bed 506 may be padded or coated with a protective layer from below to rest on a ground surface without damaging the cargo bed 506. In some embodiments, the cargo bed 506 may have one or more legs that are extendable from below for the cargo bed 506 to stand on a ground surface. During transport, the cargo bed 506 may be held from one or more grips located on the cargo bed 506 that may be similar in structure and functionality to the grips 114 shown in FIGS. 1A-1B. In some embodiments, the cargo bed 506 may have one or more wheels and a handle, which may be telescoping, to roll the cargo bed 506 on a ground surface like a rolling backpack or a cooler.

Figure 8:
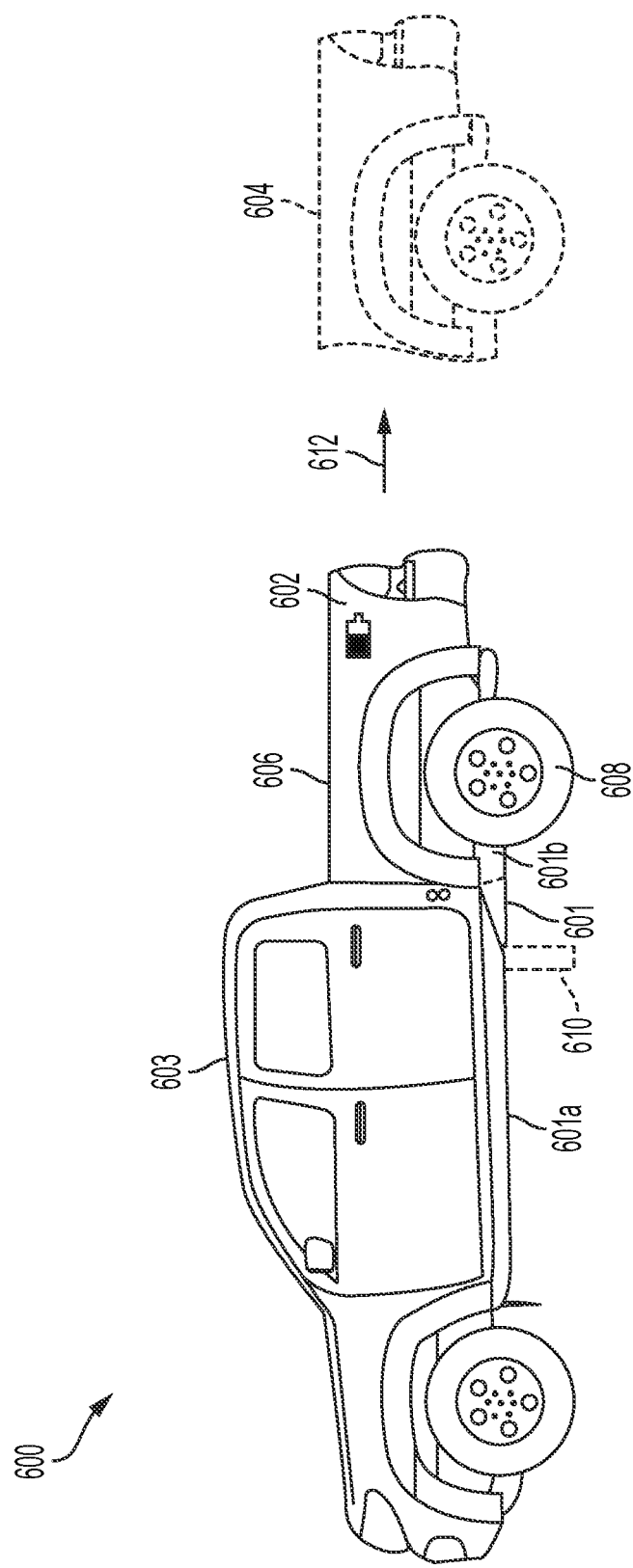
FIG. 8 illustrates a side view of a vehicle having a removable cargo bed storing a power source according to an aspect of the present disclosure.

FIG. 8 illustrates a side view of a vehicle 600 having a removable cargo bed 606 storing a power source 602. The vehicle 600 may have some or all of the specifications of the vehicle 100 (see FIGS. 1A-1B). The power source 602 may have some or all of the specifications of the power source 102 (see FIGS. 1A-1B) except for the physical structure of the power source 102. The power source 602 may be stored in or on the cargo bed 606. The power source 602 may be enclosed or encased by the cargo bed 606 in entirety or partially. The power source 602 may be fully or partially integrated with the cargo bed 606. The cargo bed 606 and/or an enclosure disposed over the power source 602 may be made from a material or materials that protect the power source 602 from physical impact. The power source 602 may be fastened to the cargo bed 606 via conventional fasteners (e.g., tracks, clips, hooks, anchors, screws, etc.) to prevent the power source 602 from moving around and disconnecting from the electric motor and the electric circuit of the vehicle 600, especially when the vehicle 600 is in motion.

The vehicle 600 may have a cabin 603. The cabin 603 may hold at least one person, which may be a driver and/or a passenger. The cabin 603 and the cargo bed 606 may be individually or collectively coupled to a frame 601 of the vehicle 600. The cargo bed 606 may also be directly coupled to the cabin 603. The cargo bed 606 may be fastened to the frame 601 and the cabin 603 via conventional fasteners (e.g., tracks, clips, hooks, anchors, screws, etc.). The cargo bed 606 and hence the power source 602 may be detached from the cabin 603 by the split of the frame 601. The frame 601 may be split such that the cabin 603 remains intact on a first portion 601*a* of the frame 601 and the cargo bed 606 remains intact on a second portion 601*b* of the frame 601. The rear wheel or rear wheels 608 of the vehicle 600 may remain intact with the second portion 601*b* and thus the cargo bed 606. The first portion 601*a* may be fastened to the second portion 601*b* via conventional fasteners (e.g., tracks, clips, hooks, anchors, screws, etc.). The cargo bed 606 in a detached state is shown by dashed lines 604. Prior to detachment, a leg or a stand 610 may be placed under the first portion 601*a* to prevent the cabin 603 from making contact with the ground. The stand 610 may be attached to the vehicle 600 or remote from the vehicle 600. If attached to the vehicle 600, the stand 610 may telescope or pivot down from under the first portion 601*a* to make contact with the ground. The cargo bed 606 may be detached by pulling the cargo bed 606 in the direction of the arrow 612. The cargo bed 606 may be rolled on the rear wheels 608 during detachment.

While the cargo bed 606 is coupled to the cabin 603, the power source 602 may be electrically coupled to the electric motor and native electric devices of the vehicle 600 as well as auxiliary devices electrically coupled to an electrical circuit of the vehicle 600. The electrical connection may be concealed between the cabin 603 and the cargo bed 606 or under the vehicle 600 by example. As such, the power source 602 may be entirely concealed and the cargo bed 606 may have the appearance of a conventional cargo bed.

Once detached from the vehicle 600, the cargo bed 606 and hence the power source 602 may be transported to a location away from the vehicle 600 and positioned as desired to supply power to remote devices 118*a-c* (see FIG. 2). In some embodiments, the cargo bed 606 may have one or more legs that are extendable from below for the cargo bed 606 to balance the cargo bed 606 on a ground surface and prevent the rear wheels 608 from rotating. During transport, the cargo bed 606 may be held from one or more grips located on the cargo bed 606 that may be similar in structure and functionality to the grips 114 shown in FIGS. 1A-1B. In some embodiments, the cargo bed 606 may have a handle, which may be telescoping, to roll the cargo bed 606 using the rear wheels 608 on a ground surface like a rolling backpack or a cooler.

Figure 9:
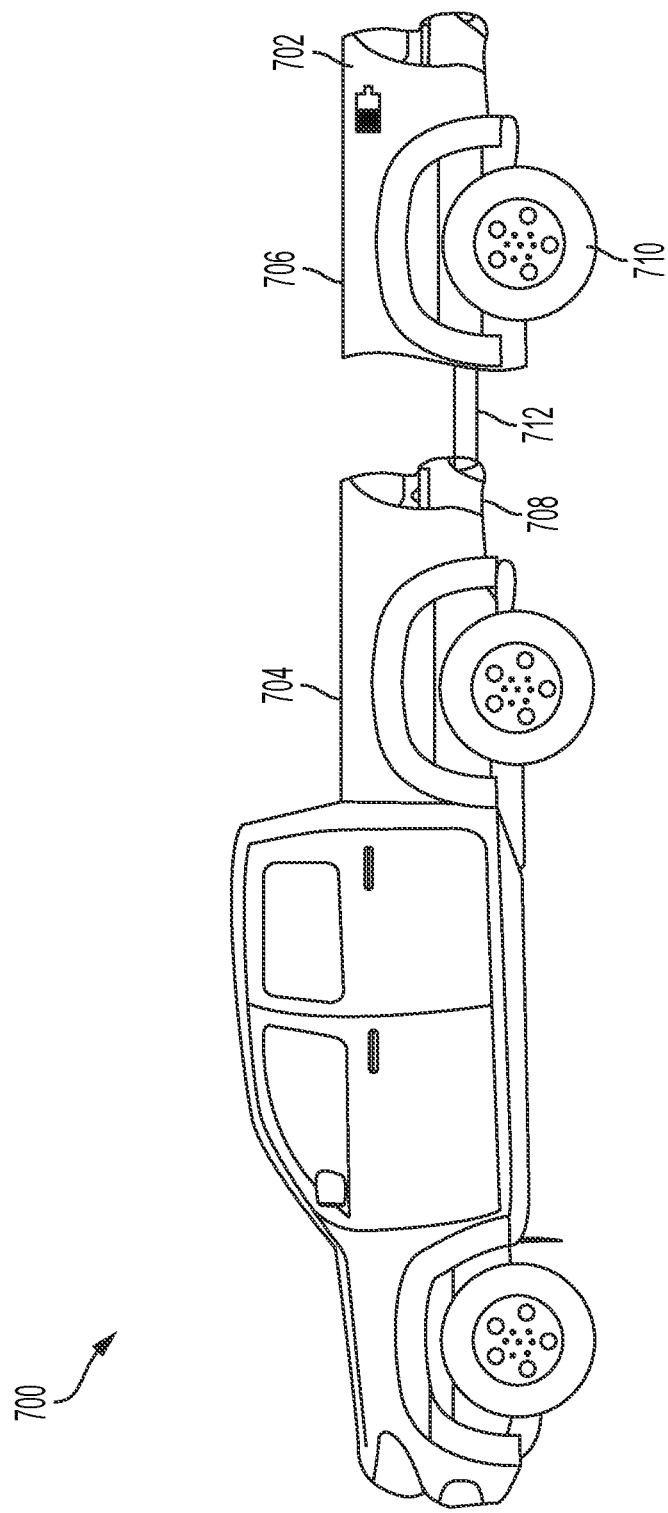
FIG. 9 illustrates a side view of a vehicle towing a trailer storing a power source according to an aspect of the present disclosure.

FIG. 9 illustrates a side view of a vehicle 700 towing a trailer 706 storing a power source 702. The vehicle 700 may have some or all of the specifications of the vehicle 100 (see FIGS. 1A-1B). The vehicle 700 may also be any other type of automobile (e.g., a sedan, a hatchback, a crossover, a station wagon, etc.), a motorcycle, or a trike by example. The vehicle 700 may have a native power source in addition to the power source 702. The power source 702 may have some or all of the specifications of the power source 102 (see FIGS. 1A-1B) except for the physical structure of the power source 102. The power source 702 may be stored in or on the trailer 706. The trailer 706 may have the same or a similar shape and size to a cargo bed 704 of the vehicle 700. The power source 702 may be enclosed or encased by the trailer 706 in entirety or partially. The power source 702 may be fully or partially integrated with the trailer 706. The trailer 706 and/or an enclosure disposed over the power source 702 may be made from a material or materials that protect the power source 702 from physical impact. The power source 702 may be fastened to the trailer 706 via conventional fasteners (e.g., tracks, clips, hooks, anchors, screws, etc.) to prevent the power source 702 from moving around and disconnecting from the electric motor and the electric circuit of the vehicle 700, especially when the vehicle 700 is in motion.

The trailer 706 may be coupled to the vehicle 700 like a conventional trailer is coupled to a vehicle. For example, the trailer 706 may be coupled to a rear bumper 708 and/or the cargo bed 704 of the vehicle 700. The trailer 706 may be coupled to the rear bumper 708 and/or the cargo bed 704 via conventional fasteners (e.g., tracks, clips, hooks, anchors, screws, etc.). The trailer 706 and hence the power source 702 may be detached from the vehicle 700 by undoing the fasteners. The wheel or wheels 710 of the vehicle 700 may remain intact with the trailer 706 following detachment.

While the trailer 706 is coupled to the vehicle 700, the power source 702 may be electrically coupled to the electric motor and native electric devices of the vehicle 700 as well as auxiliary devices electrically coupled to an electrical circuit of the vehicle 700. The electrical connection may be concealed inside a connector 712 that fastens the trailer 706 to the vehicle 700 by example. As such, the power source 702 may be entirely concealed and the trailer 706 may have the appearance of a conventional trailer.

Once detached from the vehicle 700, the trailer 706 and hence the power source 702 may be transported to a location away from the vehicle 700 and positioned as desired to supply power to remote devices 118*a-c* (see FIG. 2). During transport, the trailer 706 may be held from one or more grips located on the trailer 706 that may be similar in structure and functionality to the grips 114 shown in FIGS. 1A-1B. In some embodiments, the trailer 706 may have a handle, which may be telescoping, to roll the trailer 706 using the wheels 710 on a ground surface like a rolling backpack or a cooler.

Figure 10:
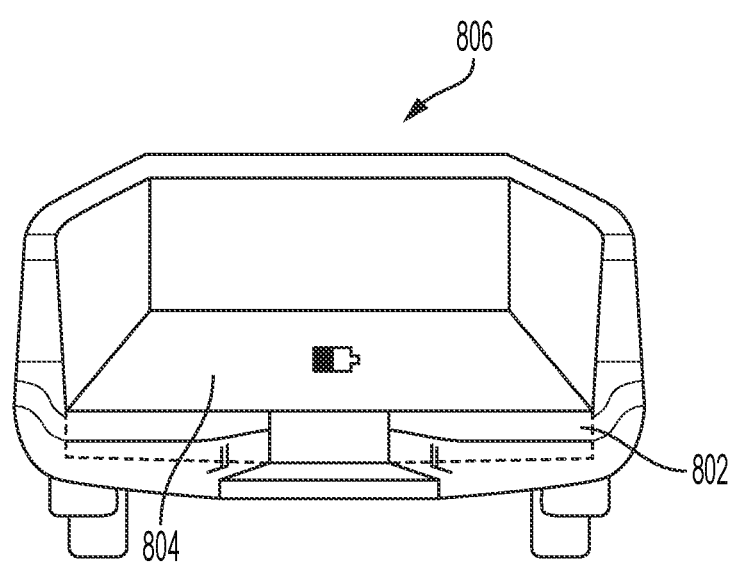
FIG. 10 illustrates a rear view of a trailer having a power source integrated with a detachable floor of the trailer according to an aspect of the present disclosure.

FIG. 10 illustrates a rear view of a trailer 806 having a power source 802 integrated with a detachable floor 804 of the trailer 806. The trailer 806 may be towed by a vehicle that may have some or all of the specifications of the vehicle 700 (see FIG. 9). The trailer 806 may be similar to the cargo bed 106 (see FIGS. 1A-1B). The power source 802 may have some or all of the specifications of the power source 102 (see FIGS. 1A-1B) except for the physical structure of the power source 102.

Figure 11:
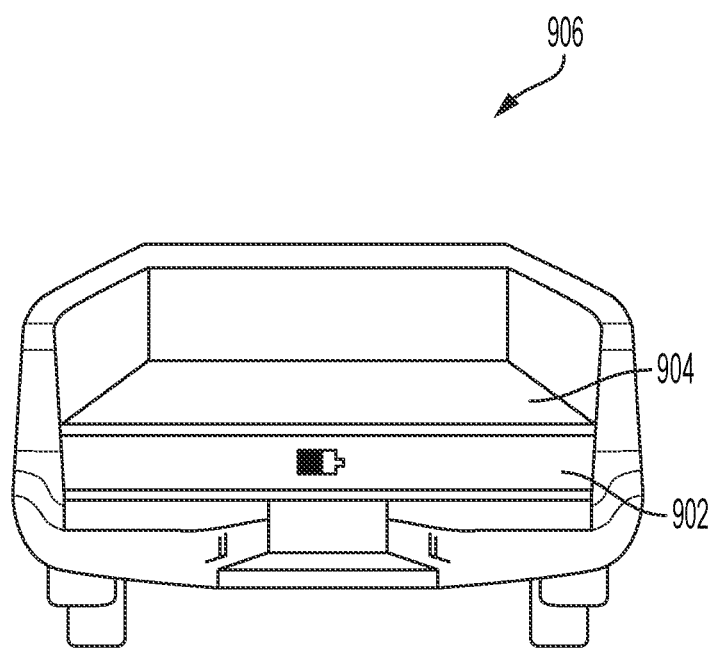
FIG. 11 illustrates a rear view of a trailer having a removable power source under a false floor of the trailer according to an aspect of the present disclosure.

FIG. 11 illustrates a rear view of a trailer 906 having a removable power source 902 under a false floor 904 of the trailer 906. The trailer 906 may be towed by a vehicle that may have some or all of the specifications of the vehicle 700 (see FIG. 9). The trailer 906 may be similar to the cargo bed 206 (see FIGS. 3A-3B). The power source 902 may have some or all of the specifications of the power source 102 (see FIGS. 1A-1B) except for the physical structure of the power source 102.

Figure 12A:
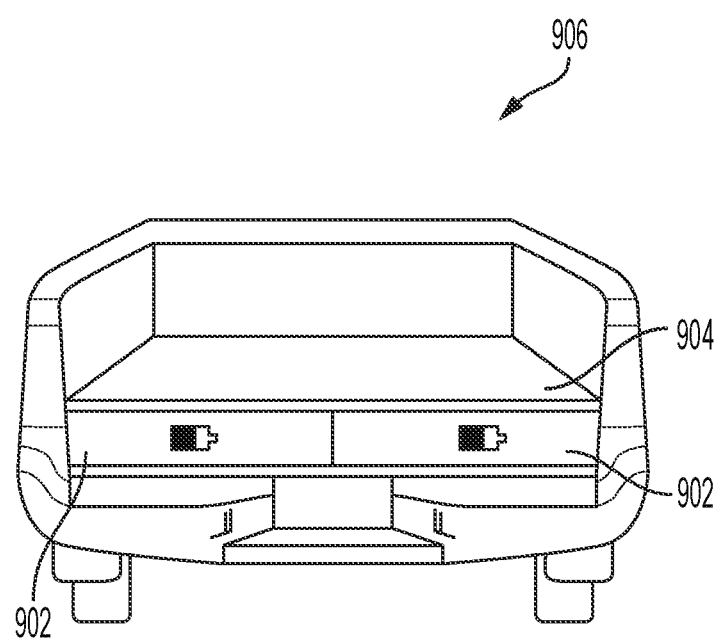
FIG. 12A illustrates a rear view of a trailer having multiple power sources stacked next to each other under a false floor of the trailer according to an aspect of the present disclosure.

FIG. 12A illustrates a rear view of the trailer 906 having multiple power sources 902 stacked next to each other under the false floor 904 of the trailer 906. The trailer 906 may be similar to the cargo bed 206 (see FIG. 4A) in the embodiment shown in FIG. 12A.

Figure 12B:
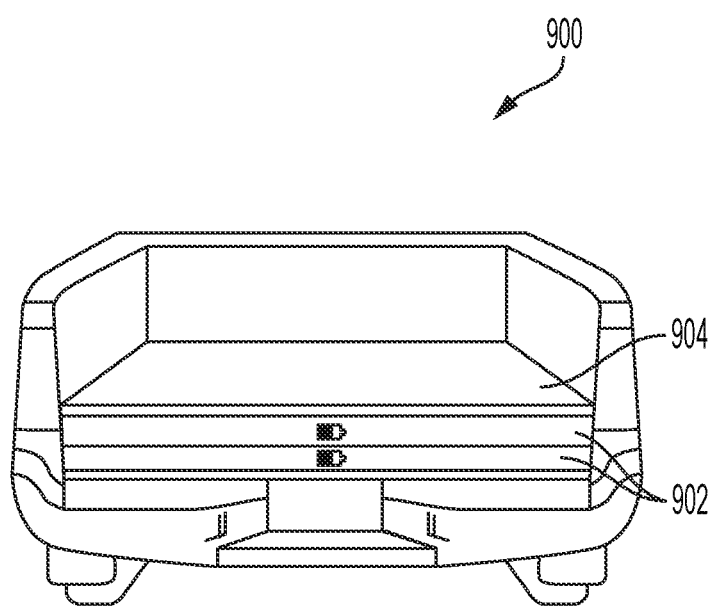
FIG. 12B illustrates a rear view of a trailer having multiple power sources stacked on top of each other under a false floor of the trailer according to an aspect of the present disclosure.

FIG. 12B illustrates a rear view of the trailer 906 having multiple power sources 902 stacked on top of each other under the false floor 904 of the trailer 906. The trailer 906 may be similar to the cargo bed 206 (see FIG. 4B) in the embodiment shown in FIG. 12B. In some embodiments, the multiple power sources 902 may be both stacked on top of each other and next to each other.

Figure 13:
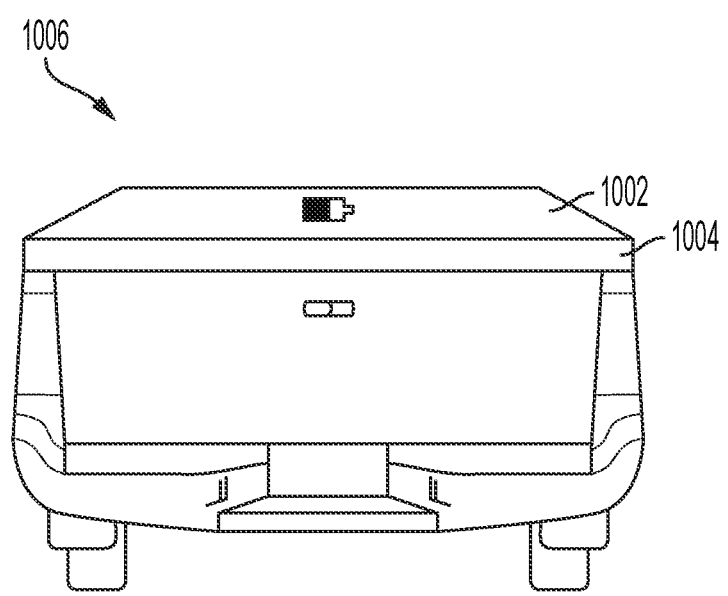
FIG. 13 illustrates a rear view of a trailer having a power source integrated with a detachable enclosure of the trailer according to an aspect of the present disclosure.

FIG. 13 illustrates a rear view of a trailer 1006 having a power source 1002 integrated with a detachable enclosure 1004 of the trailer 1006. The trailer 1006 may be towed by a vehicle that may have some or all of the specifications of the vehicle 700 (see FIG. 9). The trailer 1006 may be similar to the cargo bed 306 (see FIG. 5). The power source 1002 may have some or all of the specifications of the power source 102 (see FIGS. 1A-1B) except for the physical structure of the power source 102.

Figure 14:
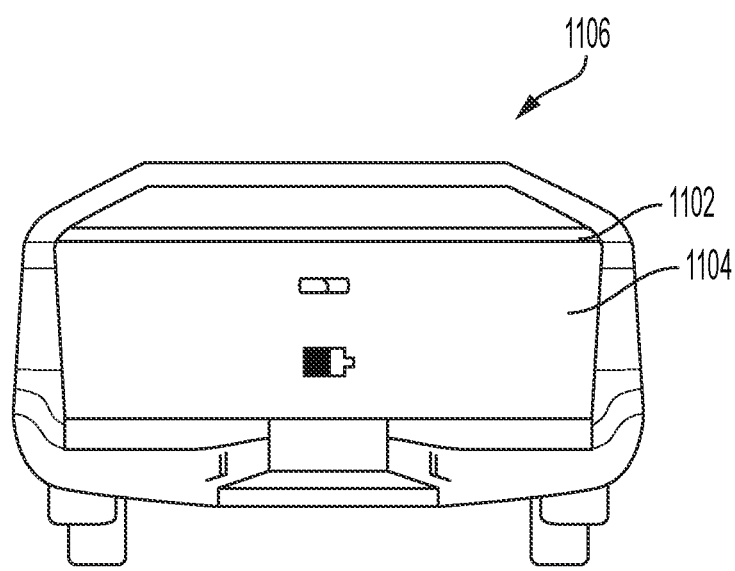
FIG. 14 illustrates a rear view of a trailer having a detachable power source integrated with a tailgate according to an aspect of the present disclosure.

FIG. 14 illustrates a rear view of a trailer 1106 having a detachable power source 1102 integrated with a tailgate 1104. The trailer 1106 may be towed by a vehicle that may have some or all of the specifications of the vehicle 700 (see FIG. 9). The trailer 1106 may be similar to the cargo bed 406 (see FIG. 6). The power source 1102 may have some or all of the specifications of the power source 102 (see FIGS. 1A-1B) except for the physical structure of the power source 102.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle comprising:
   a power source detachable from the vehicle and configured to supply power to the vehicle; and
   a cargo bed configured to store the power source, the cargo bed includes at least one of:
      a detachable cargo bed enclosure extending between and to an uppermost end of a first sidewall of the cargo bed and an uppermost end of a second sidewall of the cargo bed, the detachable cargo bed enclosure is configured to enclose an interior of the cargo bed, and the power source is disposed at least partially in, and integrated with, the cargo bed enclosure; or
      a tailgate, the power source is disposed at least partially in, and integrated with, the tailgate.

2. The vehicle of claim 1, wherein the power source is a plurality of modular batteries configured to be stacked on top of or next to each other.

3. The vehicle of claim 1, further comprising:
   a frame, the cargo bed having at least one portion configured to be removably attached to the frame; and
   a cabin configured to be coupled to the frame and hold a person; and
   the cargo bed and the power source are configured to be detached from the cabin and the frame while the cabin remains attached to the frame.

4. The vehicle of claim 3, wherein the cargo bed is coupled to one or more wheels configured to rotate on a ground surface to tow the cargo bed and the power source to a desired location when the cargo bed is detached from the cabin.

5. The vehicle of claim 1, wherein the cargo bed includes a floor configured to support a second power source and a false floor configured to cover the second power source, the second power source is disposed between the floor and the false floor, and the false floor extends between and to the first sidewall of the cargo bed and the second sidewall of the cargo bed.

6. The vehicle of claim 1, wherein the cargo bed enclosure is configured to extend forward from the tailgate of the cargo bed.

7. A system comprising:
   a vehicle;
   a trailer configured to be removably coupled to the vehicle, the trailer includes a cargo bed, a floor defining a bottom surface of the cargo bed and detachably coupled to the trailer, and a compartment disposed underneath the floor; and
   a power source configured to supply power to the vehicle and disposed within the compartment underneath the floor.

8. The system of claim 7, wherein the power source is a plurality of modular batteries configured to be stacked on top of or next to each other.

9. The system of claim 7, wherein the trailer is coupled to one or more wheels configured to rotate on a ground surface to tow the trailer to a desired location when the trailer is detached from the vehicle.

10. The system of claim 7, wherein the trailer comprises a detachable enclosure configured to cover at least a portion of the trailer and the power source is disposed in, and integrated with, the enclosure.

11. The system of claim 7, wherein the trailer comprises a tailgate and the power source is disposed in, and integrated with, the tailgate.

12. The system of claim 7, wherein the floor and the power source are configured to be inserted within and rest in the compartment that extends below the cargo bed of the trailer.

13. The system of claim 7, wherein the power source is disposed in and integrated with the floor.

14. A vehicle comprising:
   a frame;
   a cabin configured to be coupled to the frame and hold a person;
   a cargo bed having at least one portion configured to be removably attached to the frame; and
   a power source configured to be coupled to the at least one portion of the cargo bed and supply power to the vehicle, the at least one portion includes a floor of the cargo bed, and the power source is disposed in, and integrated with, the floor.

15. The vehicle of claim 14, wherein the power source is a plurality of modular batteries configured to be stacked on top of or next to each other.

16. The vehicle of claim 14, wherein the at least one portion of the cargo bed is coupled to one or more wheels configured to rotate on a ground surface to tow the power source to a desired location when the at least one portion is detached from the frame.

17. The vehicle of claim 14, wherein the power source is at least partially encased by the floor.

18. The vehicle of claim 14, wherein the floor is configured to be inserted within and rest in a cavity that extends below the cargo bed.

* * * * *